(12) United States Patent
Post et al.

(10) Patent No.: US 9,134,049 B2
(45) Date of Patent: Sep. 15, 2015

(54) ENERGY RECOVERY APPARATUS FOR A REFRIGERATION SYSTEM

(71) Applicant: Regal Beloit America, Inc., Beloit, WI (US)

(72) Inventors: Steven W. Post, Cassville, MO (US); Bobby D. Garrison, Cassville, MO (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

(21) Appl. No.: 14/215,329

(22) Filed: Mar. 17, 2014

(65) Prior Publication Data

US 2014/0196497 A1 Jul. 17, 2014

Related U.S. Application Data

(63) Continuation of application No. 13/788,673, filed on Mar. 7, 2013, now Pat. No. 8,716,879, which is a continuation of application No. PCT/US2011/053500, filed on Sep. 27, 2011.

(60) Provisional application No. 61/387,574, filed on Sep. 29, 2010.

(51) Int. Cl.

| F01D 15/10 | (2006.01) |
|---|---|
| F02C 6/00 | (2006.01) |
| H02K 7/18 | (2006.01) |
| H02P 9/04 | (2006.01) |
| F25B 11/02 | (2006.01) |
| F25B 11/00 | (2006.01) |
| F25B 11/04 | (2006.01) |

(52) U.S. Cl.
CPC .............. *F25B 11/02* (2013.01); *F25B 11/00* (2013.01); *F25B 11/04* (2013.01); *H02K 7/1823* (2013.01)

(58) Field of Classification Search
CPC ......... F25B 11/02; H02K 7/1823; H02K 7/18
USPC ................. 290/52; 62/87, 115, 498, 116, 172
See application file for complete search history.

(56) References Cited

U.S. PATENT DOCUMENTS 2,494,120 A * 1/1950 Ferro, Jr. .......................... 62/87
3,408,046 A 10/1968 Wollenweber, Jr. et al.

(Continued)

FOREIGN PATENT DOCUMENTS

| WO | 2006/066347 A1 | 6/2006 |
| WO | 2012/050840 A1 | 4/2012 |

OTHER PUBLICATIONS

International Search Report and Written Opinion for PCT/US2011/053500 dated Feb. 22, 2012.

*Primary Examiner* — Javaid Nasri
(74) *Attorney, Agent, or Firm* — Thompson Coburn LLP

(57) ABSTRACT

An energy recovery apparatus for use in a refrigeration system, comprises an intake port, a nozzle, a turbine and a discharge port. The intake port is adapted to be in fluid communication with a condenser of a refrigeration system. The nozzle is configured to expand refrigerant discharged from the condenser and increase velocity of the refrigerant as it passes through the nozzle. The turbine is positioned relative to the nozzle and configured to be driven by refrigerant discharged from the nozzle. The discharge port is downstream of the turbine and is configured to be in fluid communication with an evaporator of the refrigeration system.

18 Claims, 15 Drawing Sheets

(56) References Cited

U.S. PATENT DOCUMENTS

| | | |
|---|---|---|
| 3,934,424 A | 1/1976 | Goldsberry |
| 5,467,613 A | 11/1995 | Brasz |
| 5,819,554 A | 10/1998 | Glen |
| 6,272,871 B1 | 8/2001 | Eisenhour |
| 6,543,238 B2 | 4/2003 | Yamanaka et al. |
| 7,845,190 B2 | 12/2010 | Pearson |
| 8,769,983 B2 | 7/2014 | Okazaki |
| 8,776,539 B2 | 7/2014 | Verma et al. |
| 2008/0141705 A1 | 6/2008 | Eisenhour |
| 2008/0289335 A1 | 11/2008 | Drysdale |
| 2013/0181453 A1 | 7/2013 | Post et al. |
| 2014/0196497 A1 | 7/2014 | Post et al. |

\* cited by examiner

ENERGY RECOVERY APPARATUS FOR A REFRIGERATION SYSTEM

This patent application is a continuation of U.S. patent application Ser. No. 13/788,673, filed Mar. 7, 2013, now U.S. Pat. No. 8,716,879 which is a continuation of PCT patent application number PCT/US2011/53500, which was filed on Sep. 27, 2011, which claims the benefit of provisional patent application No. 61/387,574 filed Sep. 29, 2010.

BACKGROUND OF THE INVENTION

1. Field of the Invention

The present invention pertains to a refrigeration system and more specifically to the expansion valve of the refrigeration system that controls the expansion of the refrigerant between the condenser and the evaporator coils of the system.

2. Description of the Related Art

In a conventional refrigeration system, a liquid refrigerant is circulated through the system and absorbs and removes heat from an internal environment that is cooled by the system and then rejects that absorbed heat in a separate external environment.

FIG. 1 is a temperature (T) versus entropy (S) diagram of a conventional refrigeration cycle. In the conventional refrigeration cycle, refrigerant vapor enters the compressor at point 1 and is compressed to an elevated pressure at point 2. The refrigerant then travels through the condenser coil nearly at constant pressure from point 2 to point 3. At point 3, the elevated pressure of the refrigerant has a saturation temperature that is well above the ambient temperature of the external environment. As the refrigerant passes through the condenser coil the refrigerant vapor is condensed into a liquid. From point 3 to point 4 the liquid refrigerant is cooled further by about 10 degrees F. below the saturation temperature. After the condenser, from point 4 to point 5, the liquid refrigerant passes through an expansion valve and the liquid refrigerant is lowered in pressure to a liquid-vapor state, with the majority of the refrigerant being liquid. The expansion valve in the conventional refrigeration cycle is essentially an orifice. The decrease in pressure of the refrigerant is a constant enthalpy process. Entropy increases due to the mixing friction that occurs in the standard expansion valve. The cold refrigerant then passes through the evaporator coils from point 5 to point 1. A fan circulates the warm air of the internal environment across the evaporator coils and the coils gather the heat from the circulated air of the internal environment. The refrigerant vapor then returns to the compressor at point 1 to complete the refrigeration cycle.

FIG. 2 is a schematic representation of a standard refrigeration system. The standard system shown in FIG. 2 has four basic components: a compressor 6, a condenser 7, an expansion valve (also called a throttle valve) 8, and an evaporator 9. The system also typically includes an external fan 10 and an internal fan 11.

In the operation of the refrigeration system, the circulating refrigerant enters the compressor 6 as a vapor and is compressed to a high pressure, resulting in a higher temperature of the refrigerant. The hot, compressed vapor is then in the thermodynamic state known as a super-heated vapor. At this temperature and pressure, the refrigerant can be condensed with typically available ambient cooling air from the external environment of the refrigeration system.

The hot vapor is passed through the condenser where it is cooled in the condenser coils and condenses into a liquid. The external fan 10 moves the ambient air of the external environment across the condenser coils. The heat of the refrigerant passing through the condenser coils passes from the coils to the air circulated through the coils by the fan 10. As the heat of the refrigerant passes from the condenser coils into the circulating air, the refrigerant condenses to a liquid.

The liquid refrigerant then passes through the expansion valve 8 where the liquid undergoes an abrupt reduction in pressure which causes part of the liquid refrigerant to evaporate to a vapor. The evaporation lowers the temperature of the liquid and vapor refrigerant to a temperature that is colder than the temperature of the internal environment of the refrigeration system that is being cooled.

The cold liquid and vapor refrigerant are then routed through the evaporator coils. The internal fan 11 circulates the warm air of the internal environment across the coils of the evaporator 9. The warm air of the internal environment circulated by the fan 11 through the coils of the evaporator 9 evaporates the liquid part of the cold refrigerant mixture passing through the coils of the evaporator 9. Simultaneously, the circulating air passed through the coils of the evaporator 9 is cooled and lowers the temperature of the internal environment.

The refrigerant vapor exiting the coils of the evaporator 9 is routed back to the compressor 6 to complete the refrigeration cycle.

Air conditioning designers have for years increased the efficiency of the standard refrigeration cycle described above by several means. Some examples of those that have been successful include:

Use of "scroll" compressors that are more efficient than screw or piston-type compressors.

Use of high efficiency compressor motors such as electrically commutated permanent magnet motors.

Use of oversize condenser coils that lower the condenser pressure required.

Use of oversize evaporator coils that raise the evaporator pressure required.

Use of modulating systems that run part of the time at reduced load to increase overall cycle efficiency.

Use of high efficiency blower housings and blower motors to reduce the non-compressor electrical usage.

However, even with these substantial improvements, obtaining a higher seasonal energy efficiency ratio (SEER) ratings are desired together with less expensive refrigeration systems that do not involve expensive oversize copper and aluminum heat exchangers.

One area where there have been attempts in improving the efficiency in sub-critical point refrigeration cycles is in harnessing the expansion energy that is normally lost across the expansion valve. A theoretical sub-critical point refrigeration cycle that would accomplish this would have a TS diagram such as that shown in FIG. 3.

A theoretical refrigeration system that would produce a TS diagram such as that shown in FIG. 3 is shown schematically in FIG. 4.

The refrigeration cycle shown in FIG. 4 is substantially the same as the standard refrigeration cycle discussed earlier and shown in FIG. 2, except that in the refrigeration cycle of FIG. 4, the uncontrolled expansion of the refrigerant that occurs at the expansion valve is instead a controlled expansion with the resultant expansion event being closer to an isentropic event instead of an adiabatic event. The end result of the refrigeration cycle shown in FIG. 4 is that work can be removed from the controlled expansion, and additional refrigeration capacity can be used which is equal to the energy that was removed.

There have been attempts to duplicate the refrigeration cycle shown in FIG. 4 in the past, but for different reasons they were not successful.

U.S. Pat. No. 3,934,424 discloses an attempt at duplicating the refrigeration cycle shown in FIG. 4. However, the requirement of a second compressor that was mechanically coupled to the expansion valve added complexity to the attempt.

U.S. Pat. No. 5,819,554 also discloses an attempt at duplicating the refrigeration cycle of FIG. 4. However, requiring the expansion valve to be directly coupled to the compressor also increased the complexity of this attempt. In addition, putting the cold expansion refrigerant lines out at the compressor could potentially negatively affect the commercialization of the system.

U.S. Pat. No. 6,272,871 also discloses another attempt at duplicating the refrigeration cycle of FIG. 4 through the use of a positive displacement expansion valve. However, this also required a throttle valve being positioned before the expansion device so that the refrigerant moving through the device had a higher vapor content.

U.S. Pat. No. 6,543,238 also discloses an attempt to duplicate the refrigeration cycle of FIG. 4 by using a supercritical point vapor compression refrigerant cycle. This attempt employed a scroll expander, similar to a scroll compressor to expand the supercritical refrigerant. Being a supercritical point cycle, the refrigerant is never incompressible, and therefore easier to manage through the energy recovery system. This system appears practical for very large commercial-type units, but would likely be too complex and too expensive for a residential application.

SUMMARY OF THE INVENTION

The present invention overcomes the shortcomings of prior attempts to produce the refrigeration cycle shown in FIG. 4 by providing a novel energy recovery apparatus for an air conditioning system.

The energy recovery apparatus includes a nozzle and a turbine. The nozzle generally emulates an orifice-type expansion valve of the type presently employed in sub-critical point air conditioning cycles. This enables the air conditioning system of the invention to operate in a conventional manner and removes the difficulties in employing and controlling a positive displacement expansion valve.

The nozzle of the energy recovery apparatus has a diverging nozzle portion that harvests the energy through the partial phase change of the refrigerant. Without the divergent nozzle the thermodynamic energy that is available would not be realized in the velocity of the vapor/liquid stream leaving the nozzle. The enthalpy the refrigerant contains can only be harvested while allowing a phase change. This phase change requires a zone of controlled expansion, which the diverging nozzle accomplishes.

The energy recovery apparatus of one embodiment has an internal synchronous generator that generates electrical power which can be returned to the single phase 115 V or 230 V power source of the indoor air handler to reduce wattage usage. The power generated for a five ton unit is estimated to be 146 watts, which is substantial. The internal generator keeps refrigerant lines from being routed in ways that would not be commercial. The internal generator also eliminates any external shafts that would have to be refrigerant sealed, which is near impossible.

One aspect of the present invention is a subcritical-point refrigeration system comprising an evaporator, a compressor, a condenser, and an energy recovery apparatus. The evaporator comprises an intake port and a discharge port. The evaporator is configured to evaporate a cold refrigerant from a liquid-vapor state to a vapor state. The compressor comprises an intake port and a discharge portion. The intake port of the compressor is in fluid communication with the discharge port of the evaporator. The compressor is configured to receive refrigerant discharged from the evaporator and compress the refrigerant to an elevated, sub-critical pressure. The condenser comprises an intake port and a discharge port. The intake port of the condenser is in fluid communication with the discharge port of the compressor. The condenser is configured to receive refrigerant discharged from the compressor and condense the refrigerant discharged from the compressor to one of a saturated-liquid state, a liquid state cooler than the saturated-liquid state, and a liquid-vapor state near the saturated-liquid state. The energy recovery apparatus comprises an intake port and a discharge port. The intake port of the energy recovery apparatus is in fluid communication with the discharge port of the condenser. The discharge port of the energy recovery apparatus is in fluid communication with the intake port of the evaporator. The energy recovery apparatus further comprises a nozzle and a turbine, the nozzle comprises a throat region and a diverging portion. The diverging portion is downstream of the throat region. The throat has a cross-sectional area less than a cross-sectional area of the intake port of the energy recovery apparatus. The nozzle is configured to expand refrigerant discharged from the condenser and increase velocity of the refrigerant as it passes through the nozzle. The turbine is positioned and configured to be driven by refrigerant discharged from the nozzle. The discharge port of the energy recovery apparatus is downstream of the turbine. Another aspect of the present invention is a method of operating such a refrigeration system in a manner that refrigerant enters the nozzle in a liquid state and is discharged from the nozzle in a liquid-vapor state.

Another aspect of the present invention is an energy recovery apparatus for use in a refrigeration system, in which the refrigeration system comprises an evaporator, a compressor and a condenser. The evaporator is configured to evaporate a cold refrigerant from a liquid-vapor state to a vapor state. The compressor is configured to receive refrigerant discharged from the evaporator and compress the refrigerant to an elevated, sub-critical pressure. The condenser is configured to receive refrigerant discharged from the compressor and condense the refrigerant to one of a saturated-liquid state, a liquid state cooler than the saturated-liquid state, and a liquid-vapor state near the saturated-liquid state. The energy recovery apparatus comprises an intake port adapted to be in fluid communication with the condenser, a discharge port adapted to be in fluid communication with the evaporator, a nozzle, and a turbine. The nozzle comprises a throat region and a diverging portion. The diverging portion is downstream of the throat region. The throat has a cross-sectional area less than a cross-sectional area of the intake port of the energy recovery apparatus. The nozzle is configured to expand refrigerant discharged from the condenser and increase velocity of the refrigerant as it passes through the nozzle. The turbine is positioned and configured to be driven by refrigerant discharged from the nozzle. The discharge port of the energy recovery apparatus is downstream of the turbine.

Another aspect of the present invention is a method comprising selling an energy recovery apparatus. The energy recovery apparatus comprises an intake port adapted to be in fluid communication with the condenser, a discharge port adapted to be in fluid communication with the evaporator, a nozzle, and a turbine. The nozzle comprises a throat region and a diverging portion. The diverging portion is downstream of the throat region. The throat has a cross-sectional area less than a cross-sectional area of the intake port of the energy recovery apparatus. The nozzle is configured to expand refrigerant discharged from the condenser and increase velocity of the refrigerant as it passes through the nozzle. The turbine is positioned and configured to be driven by refrigerant discharged from the nozzle. The discharge port of the energy recovery apparatus is downstream of the turbine. The energy recovery apparatus further comprises a generator coupled to the turbine and driven by the turbine. The generator is configured to produce electricity as a result of the turbine being driven by refrigerant discharged from the nozzle. The energy recovery apparatus further comprises a housing encompassing the turbine and the generator. The method further comprises including with the energy recovery apparatus indicia (e.g., instructions, explanation, etc.) that the energy recovery apparatus is to be placed in fluid communication with an evaporator of a refrigeration system.

In one embodiment, the turbine of the energy recovery apparatus is a unique two-stage turbine that has only a single rotating element. The straightening veins of the turbine are part of the turbine housing, providing a unique cost-efficient structure.

DETAILED DESCRIPTION OF THE PREFERRED EMBODIMENTS OF THE INVENTION

Figure 5:
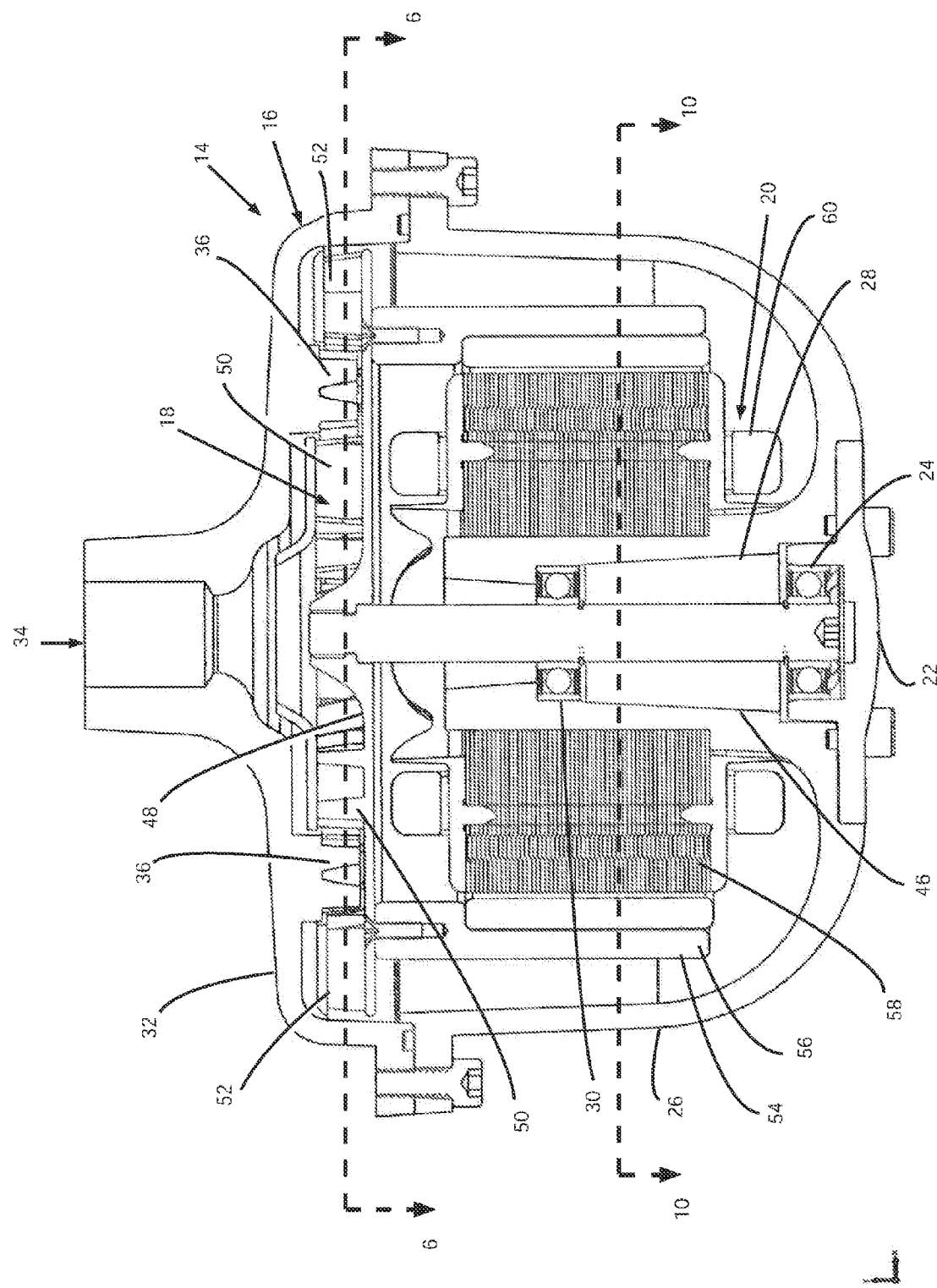
FIG. 5 is a side-sectioned view of an energy recovery apparatus of the invention.

FIG. 5 is a cross-section view of a first embodiment of an energy recovery apparatus 14 of the invention. The energy recovery apparatus 14 is basically comprised of a housing 16 containing a turbine 18 and a generator 20.

The housing 16 is comprised of three parts. A first, center housing part 22 has an interior that supports a bearing assembly 24. The center part 22 is attached to a second, side wall part 26 of the housing.

The side wall 26 extends around an interior volume of the housing 16. The side wall 26 also includes a hollow center column 28. The interior of the center column 28 supports a second bearing assembly 30.

Figure 6:
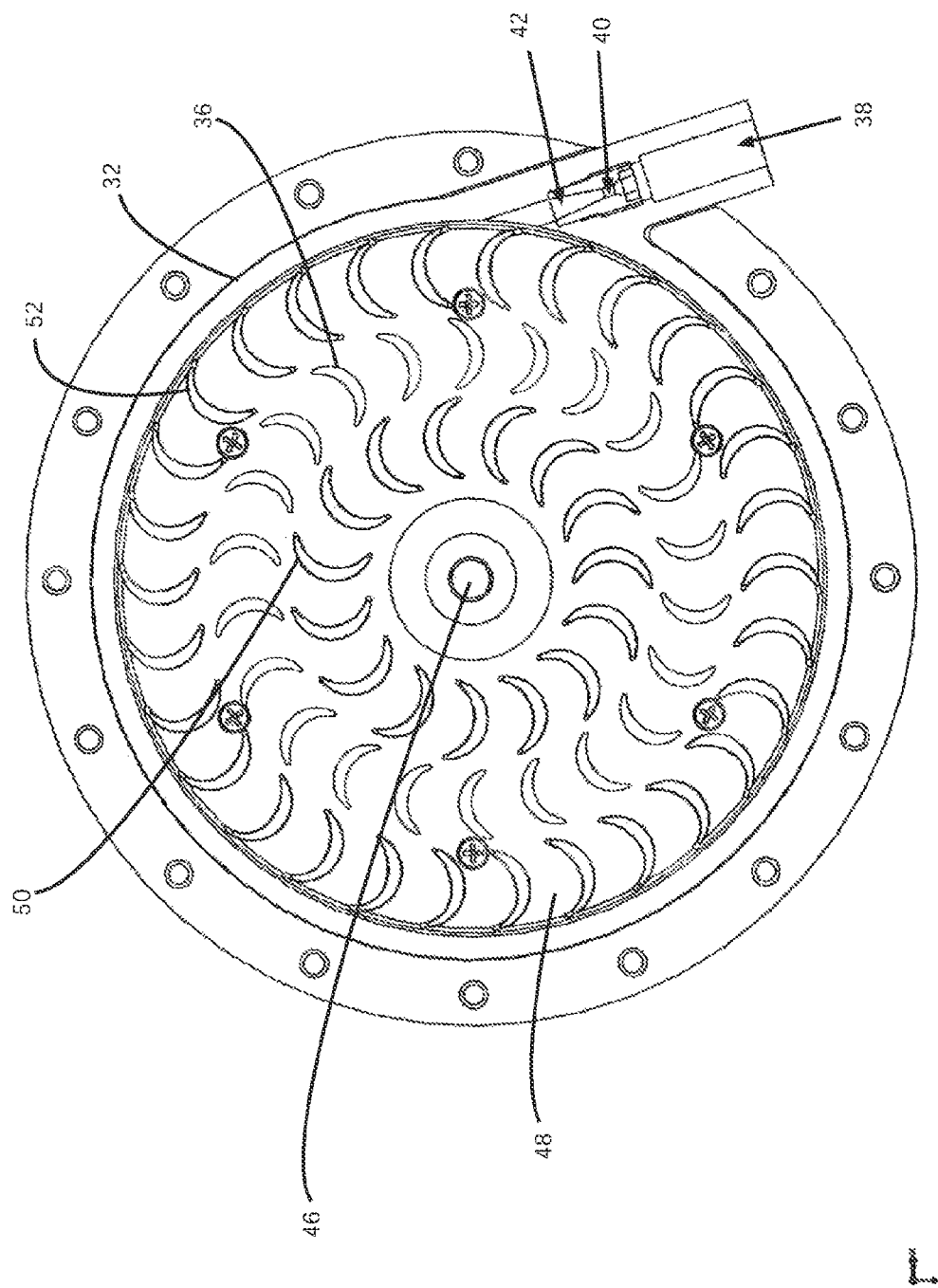
FIG. 6 is a top plan view of the energy recovery apparatus in a plane along the line 6-6 of FIG. 5.
Figure 7:
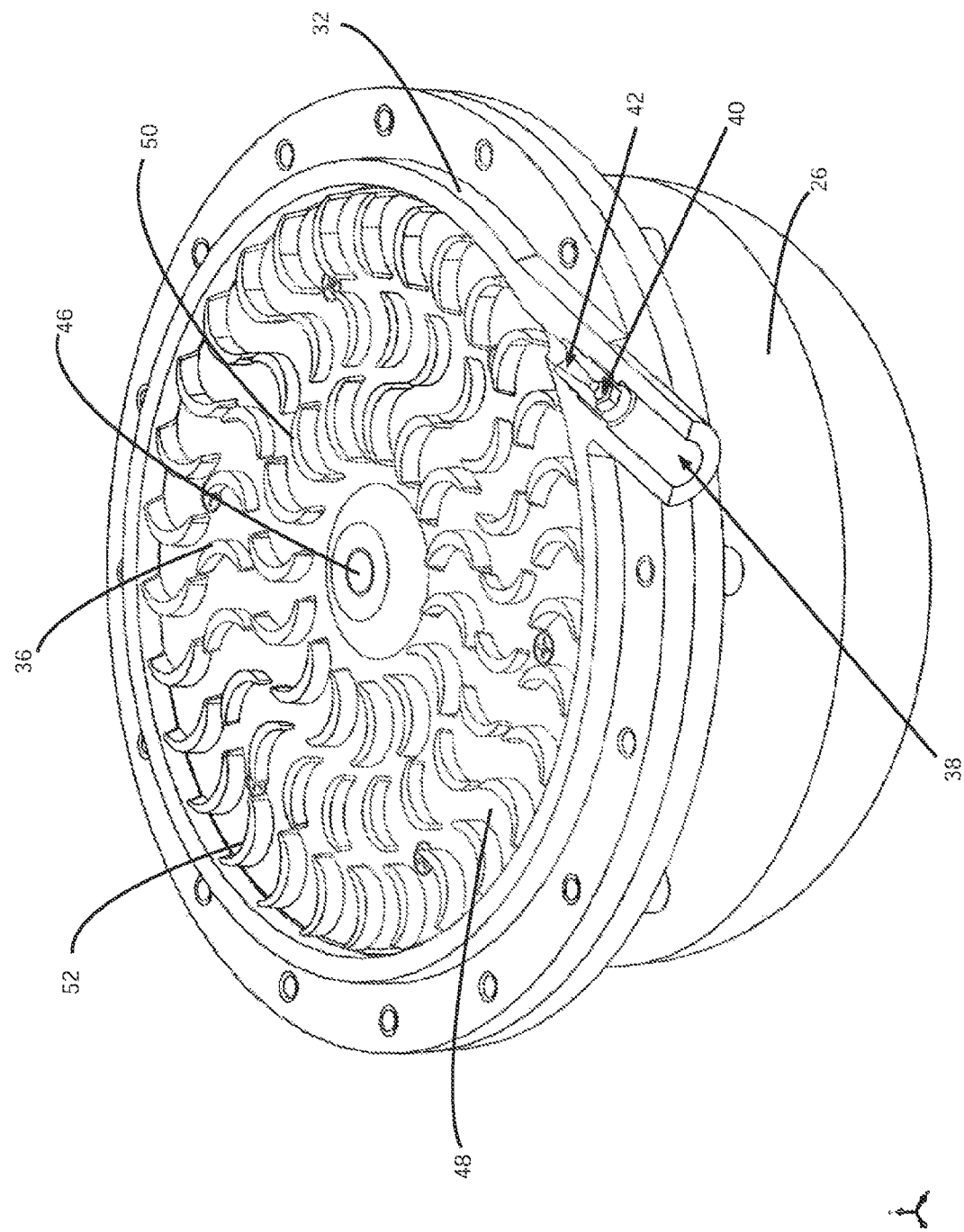
FIG. 7 is a perspective view of the energy recovery apparatus as shown in FIG. 6.

A third, cover part of the housing 32 is attached to the top of the side wall 26. The cover part 32 encloses the hollow interior of the housing 16. The cover part 32 has a center, cylindrical outlet opening 34 that is the outlet for the refrigerant passing through the expansion energy recovery apparatus 14. An interior surface of the cover part 32 is formed with integral, stationary turbine blades 36 that function as the center row of blades of the turbine 18 to be described. Referring to FIGS. 6-9, the housing cover part 32 is also formed with a refrigerant inlet opening 38. This is the inlet for the refrigerant entering the expansion energy recovery apparatus 14. FIGS. 6 and 7 show the housing cover part 32 having a nozzle insert 40 just inside the inlet opening 38. The nozzle insert 40 is formed with a diverging exit area 42 that opens into the interior of the housing 16 and in particular the interior of the housing cover part 32.

Figure 8:
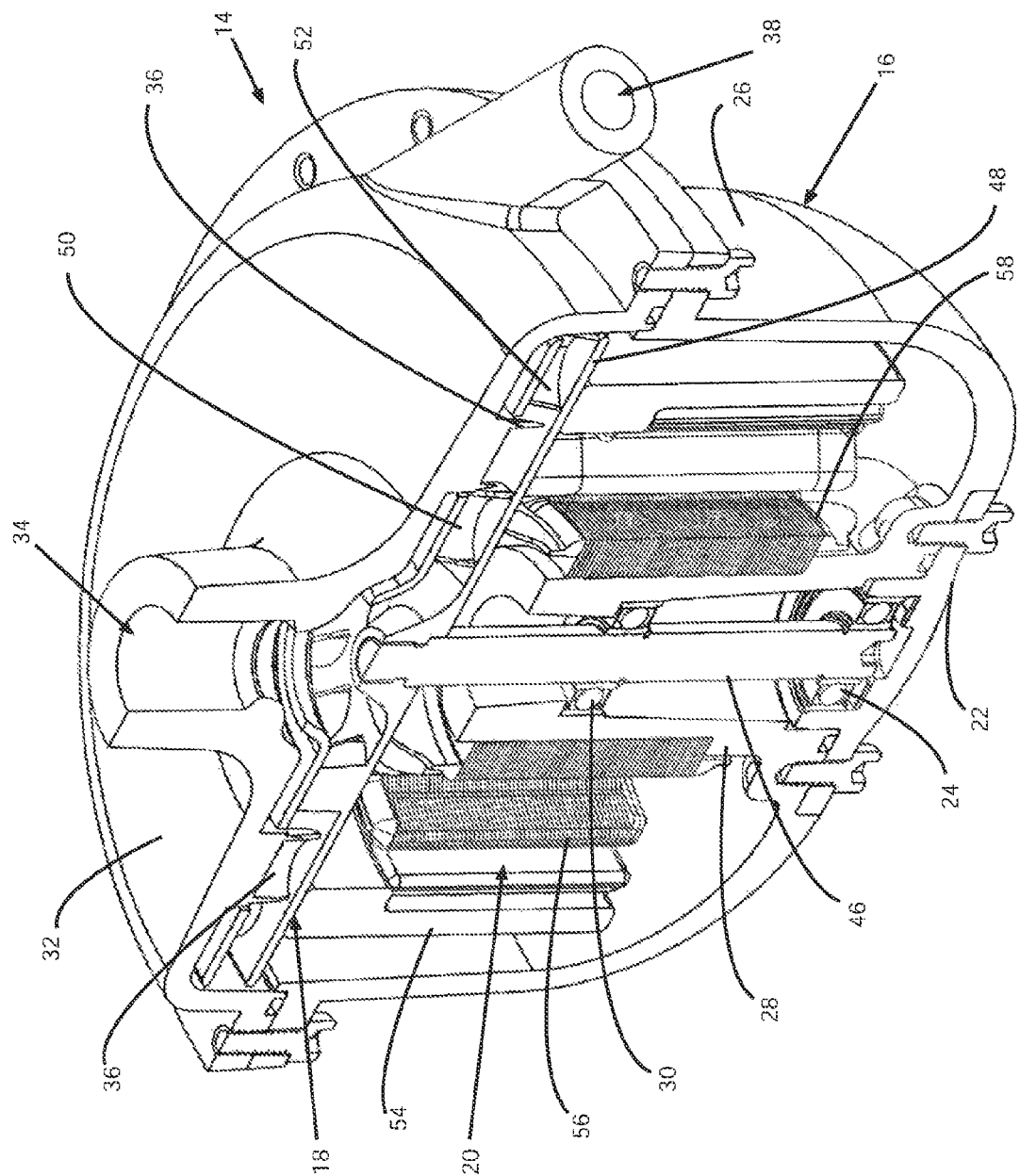
FIG. 8 is a perspective view of the energy recovery apparatus as shown in FIG. 5.
Figure 9:
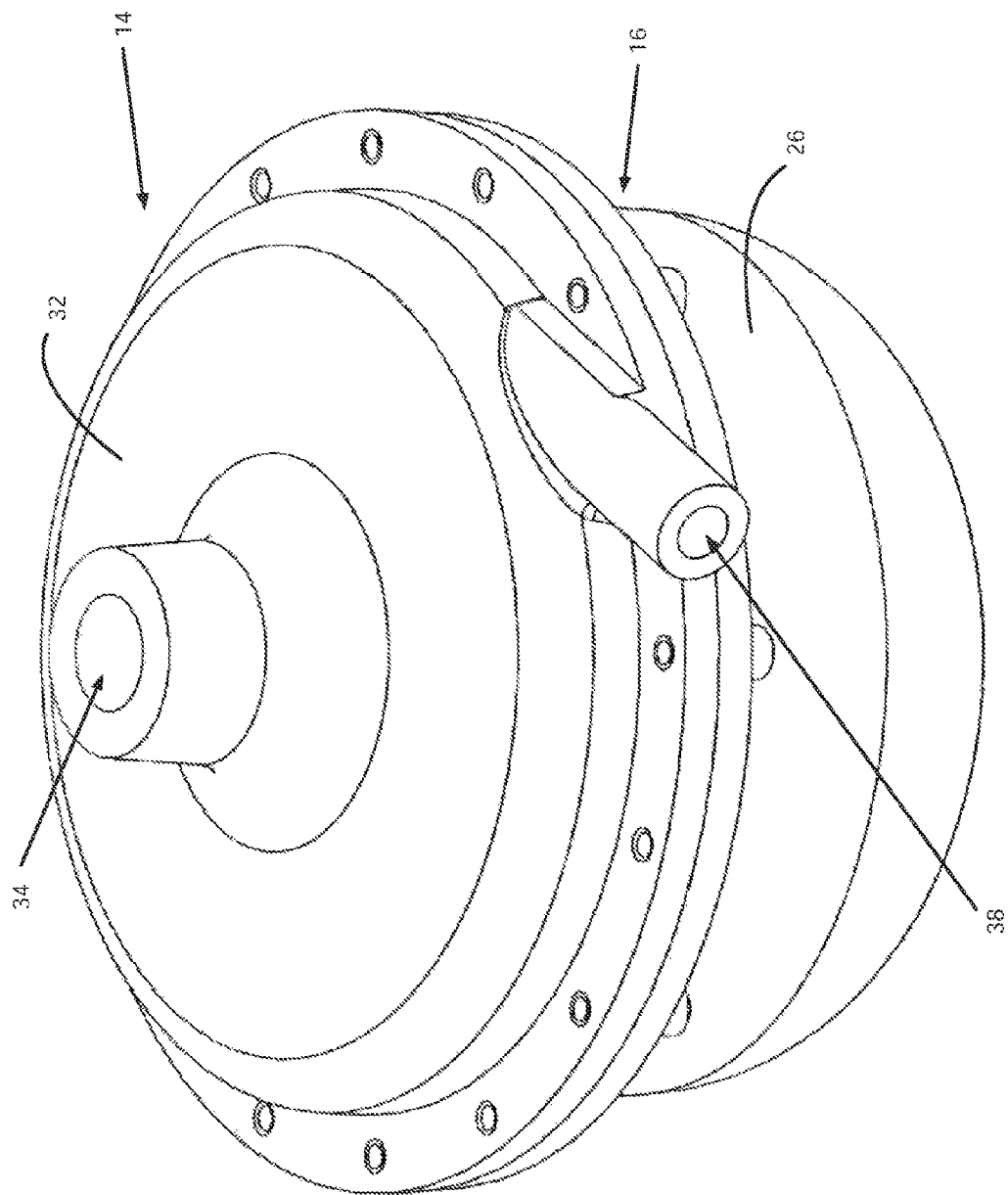
FIG. 9 is a perspective view of the exterior of the energy recovery apparatus of FIG. 5.
Figure 10:
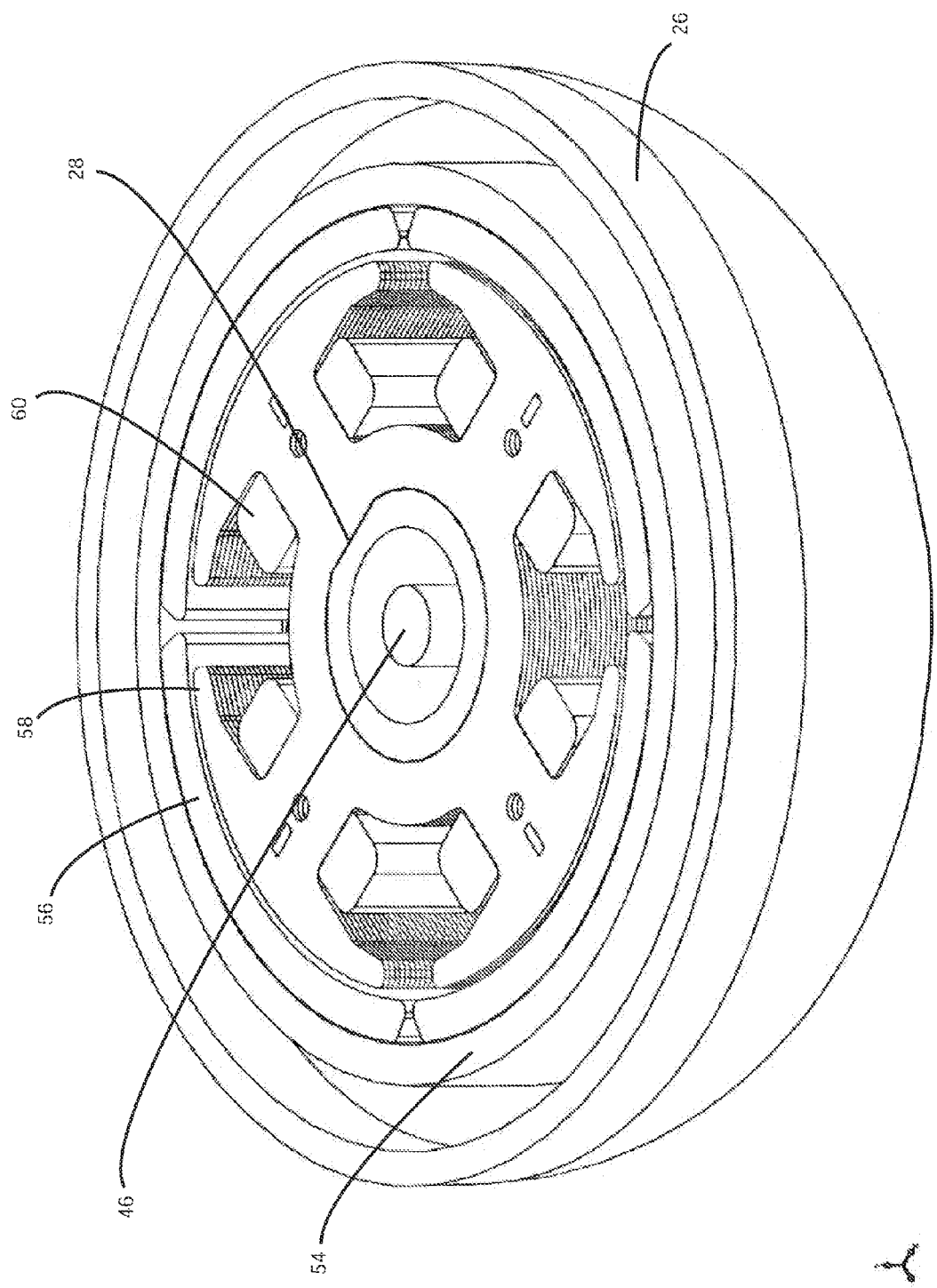
FIG. 10 is a perspective, sectioned view of the generator core of the energy recovery apparatus in the plane of line 10-10 of FIG. 5.

The turbine 18 includes a center shaft 36 mounted for rotation in the two bearing assemblies 24, 30. As shown in FIGS. 5-8, a turbine disk 48 is mounted on the top of the turbine shaft 46 for rotation with the shaft. The turbine 18 is a two-stage turbine that is comprised of a first, inner row of blades 50 and a second, outer row of blades that project upwardly from the turbine disk 48 as shown in FIGS. 5-8. FIGS. 6 and 7 show the blade orientation of the turbine 18. The center row of blades 36 are the straightening blades of the two-stage turbine. This center row of blades 36 is stationary relative to the turbine disk 48 and the inner row of blades 50 and the outer row of blades 52. Refrigerant entering the housing 16 through the nozzle insert 40 passes through the outer blades 52 on the turbine disk 48, then through the center turbine blades 46 on the housing cover 32, then through the inner blades 50 on the turbine disk 48 before exiting the housing 16 through the outlet opening 34 of the cover part 32. The bottom surface of the turbine disk 48 opposite the inner blades 50 and outer blades 52 has a cylindrical wall 54 attached thereto. The cylindrical wall 54 is the rotor backing that supports four permanent magnets 56 as shown in FIGS. 5, 8 and 10. The cylindrical wall 54 of the turbine and the four permanent magnets 56 form the outside rotor of the generator 20.

Referring to FIGS. 5, 8 and 10, the generator 20 is preferably a four pole generator comprised of a stack of stator plates 58 and four stator windings 60. The stack of stator plates 58 is secured stationary on the center column 28 of the housing side wall 26. FIG. 10 shows the relative positions of the stack of stator plates 58, the stator windings 60 and the permanent magnets 56 of the generator 20.

Figure 4:
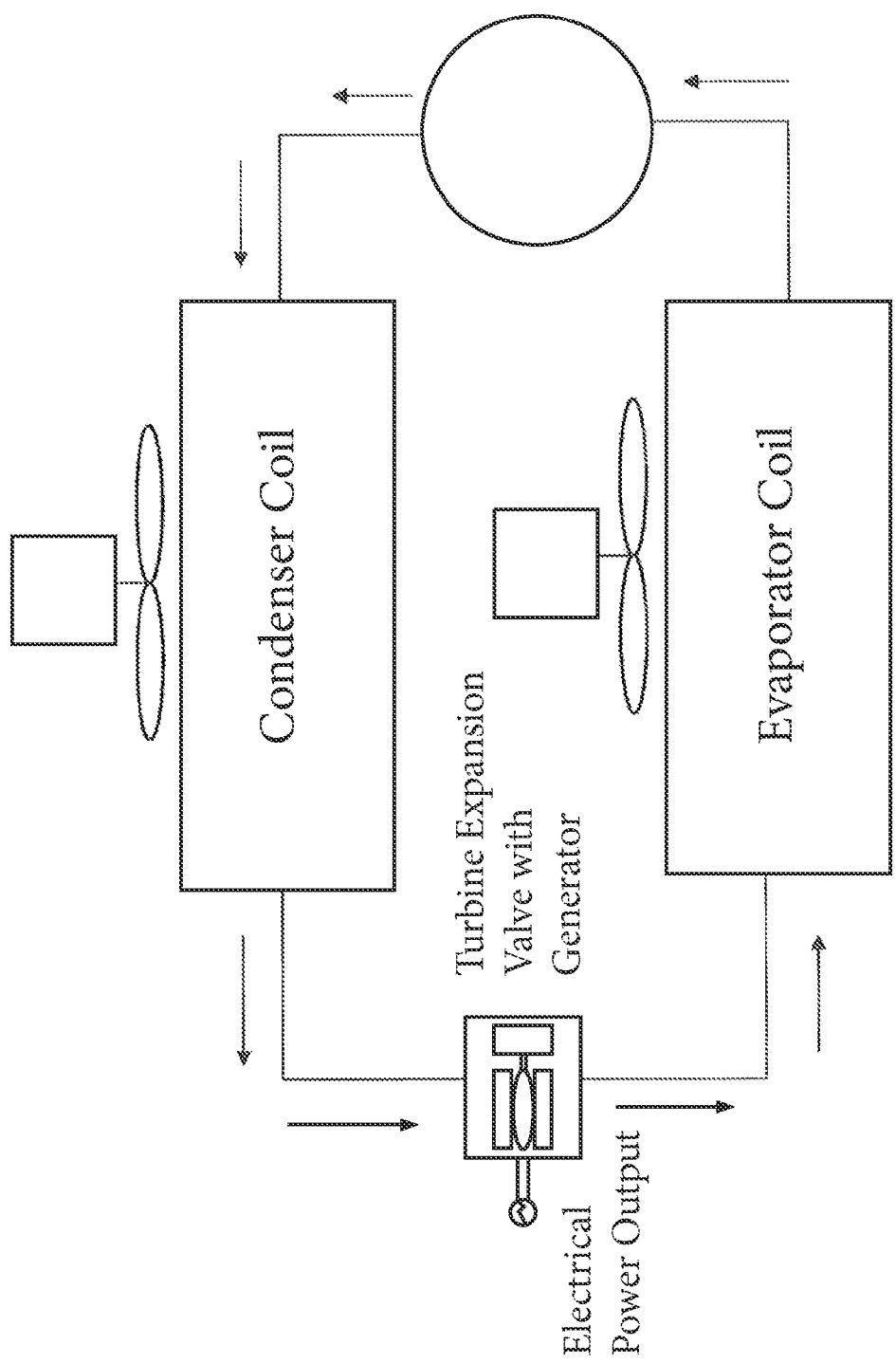
FIG. 4 is a schematic representation of a refrigeration system that would produce the TS diagram of FIG. 3.

In operation of the energy recovery apparatus 14 of the invention in a refrigerant system (e.g., an air conditioning system) such as that shown in FIG. 4, entry of refrigerant into the valve housing 16 through the nozzle insert 40 results in a counter-clockwise rotation of the turbine inner blades 50 and outer blades 52 relative to the stationary center, straightening blades 36. As the refrigerant passes between the blades, the refrigerant exits the housing through the housing outlet opening 34.

The refrigerant passing through the housing 16 causes rotation of the turbine disk 48 and the turbine shaft 46, which also causes rotation of the permanent magnets 56 on the cylindrical wall 54 which form the rotor of the generator 20. The rotation of the permanent magnets 56 induces a current in the stator windings 60 which produces electricity from the energy recovery apparatus 14. The electricity produced can be routed back to a fan of the air conditioning system to help power its needs and increase the air conditioning capacity. This increases the energy efficiency of the air conditioning system and increases the SEER rating of the air conditioning system.

Figure 1:
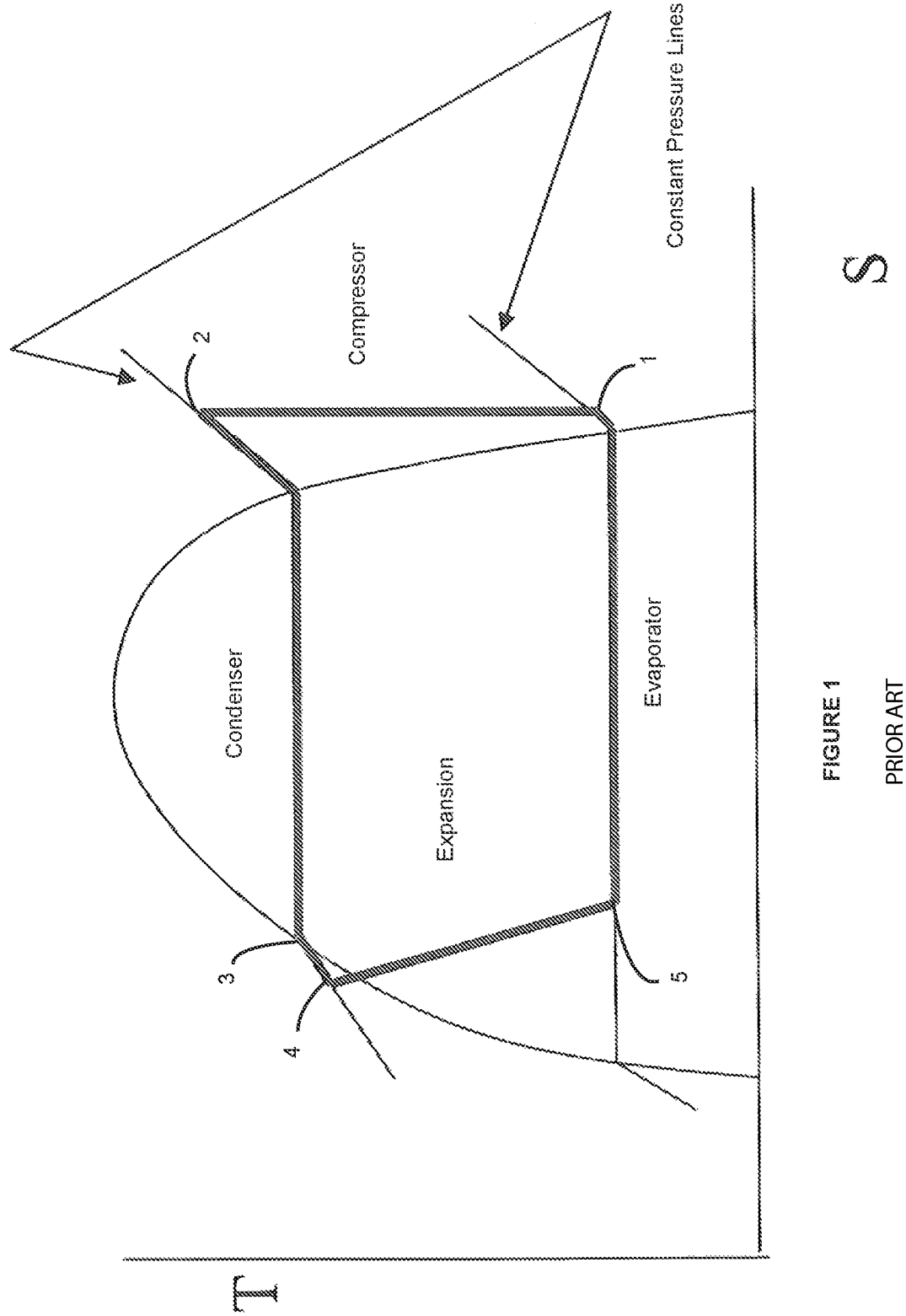
FIG. 1 is a temperature (T) versus entropy (S) diagram of a conventional refrigeration cycle.
Figure 2:
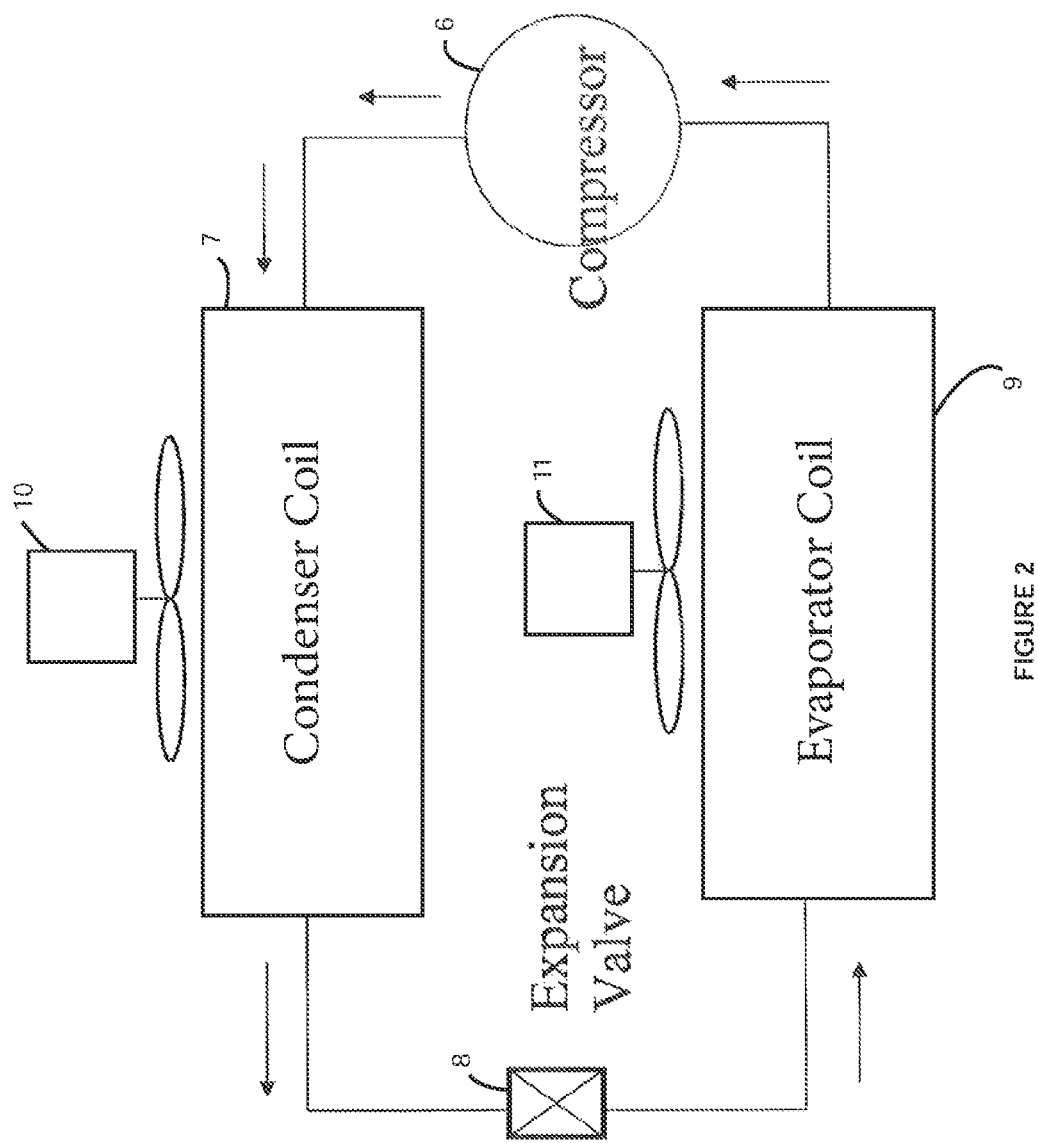
FIG. 2 is schematic representation of a standard refrigeration system.
Figure 3:
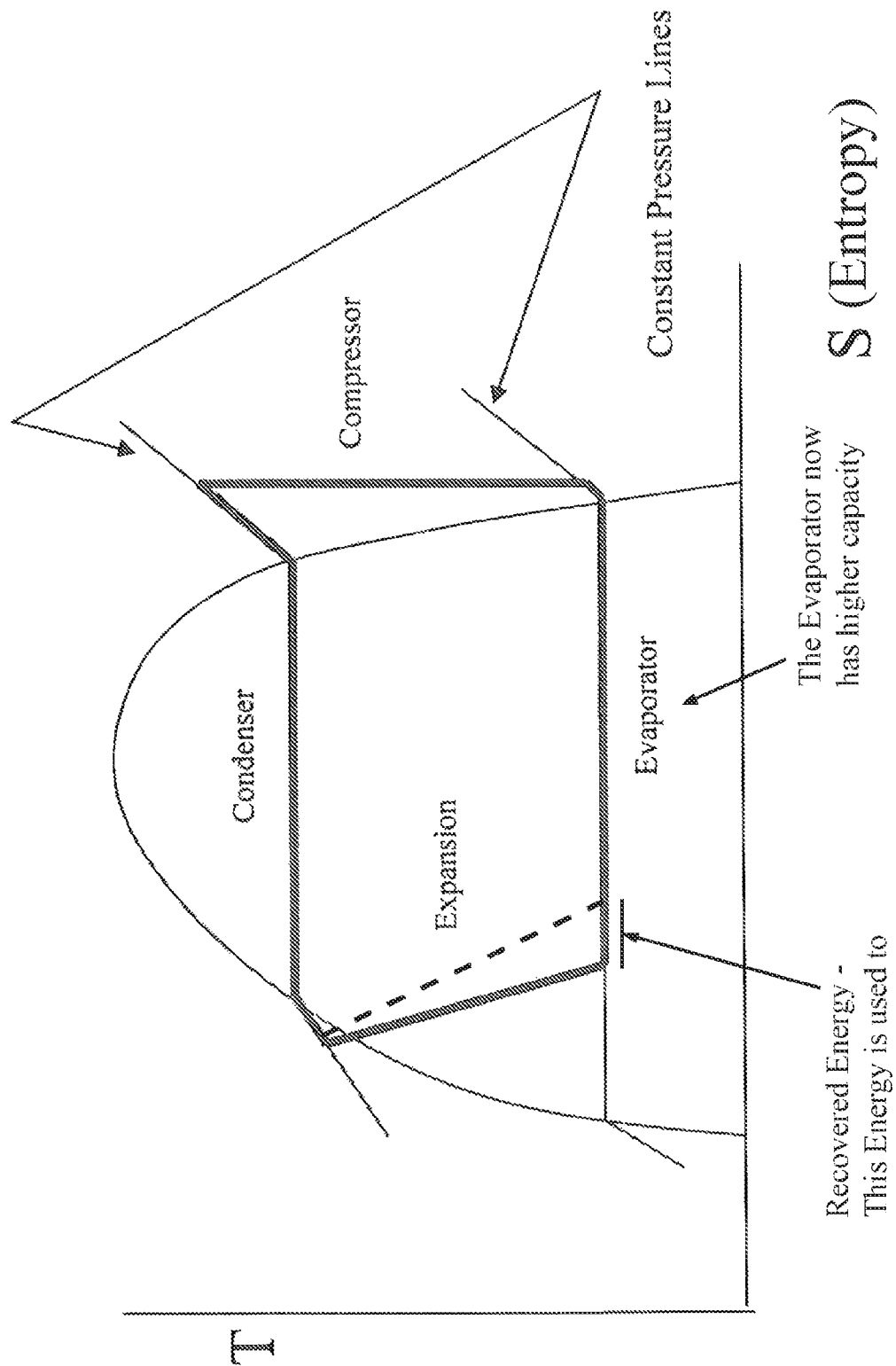
FIG. 3 is a temperature (T) versus entropy (S) diagram of a sub-critical refrigeration cycle.
Figure 11:
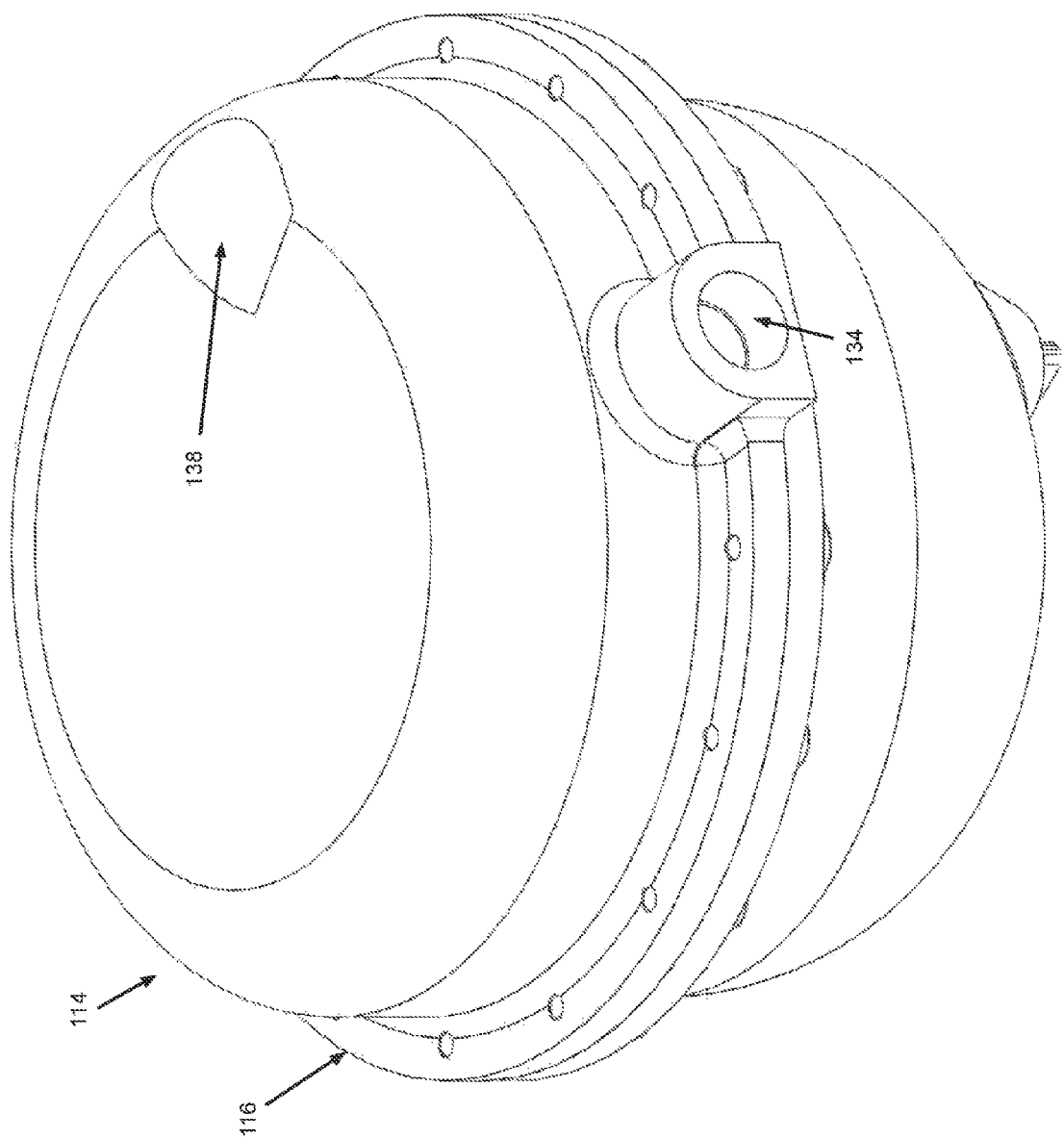
FIG. 11 is a perspective view of a second embodiment of an energy recovery apparatus of the present invention.
Figure 12:
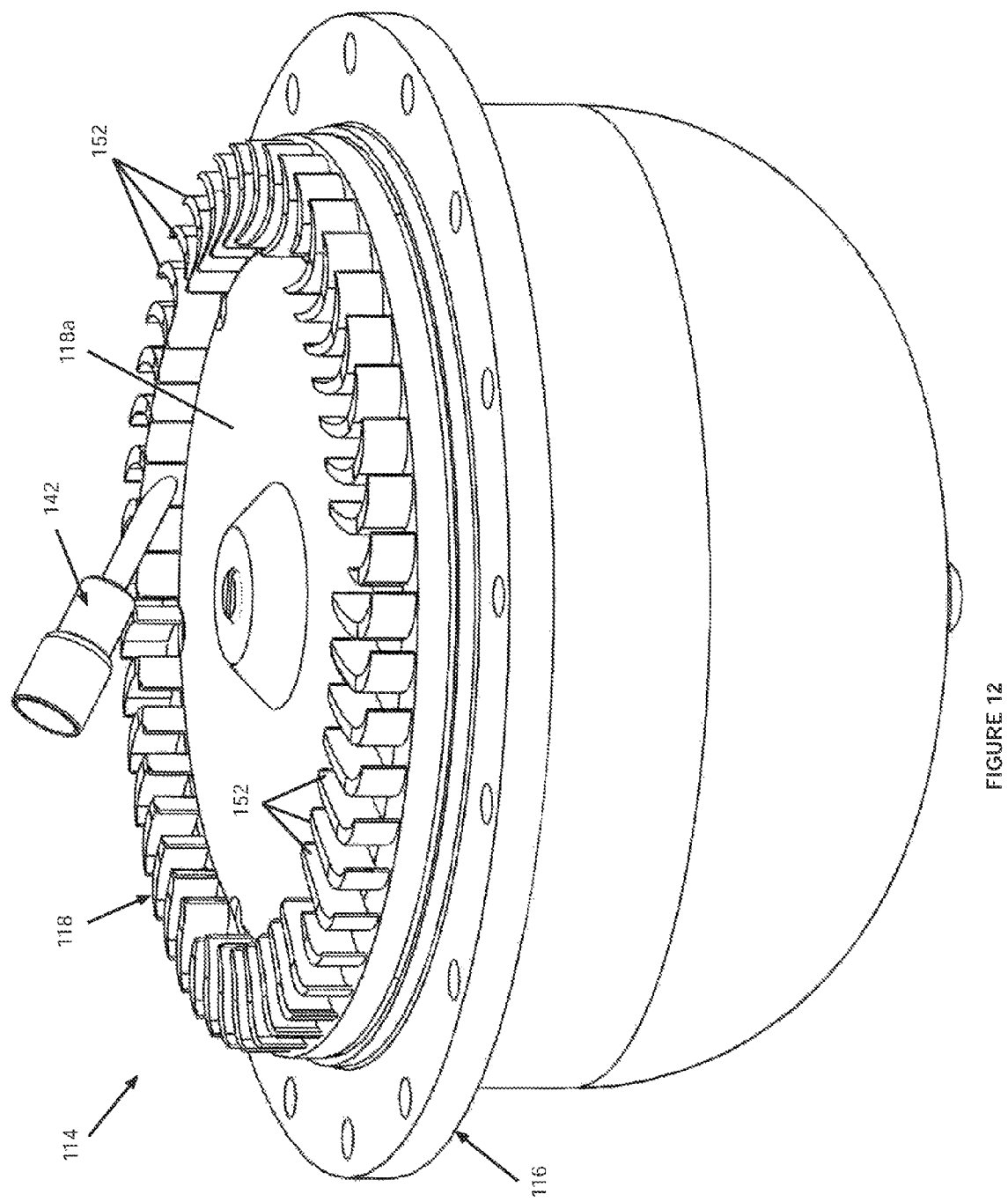
FIG. 12 is a perspective view of the energy recovery apparatus of FIG. 11 with a cover part of a housing of the energy recovery apparatus removed to show a turbine and a nozzle.
Figure 13:
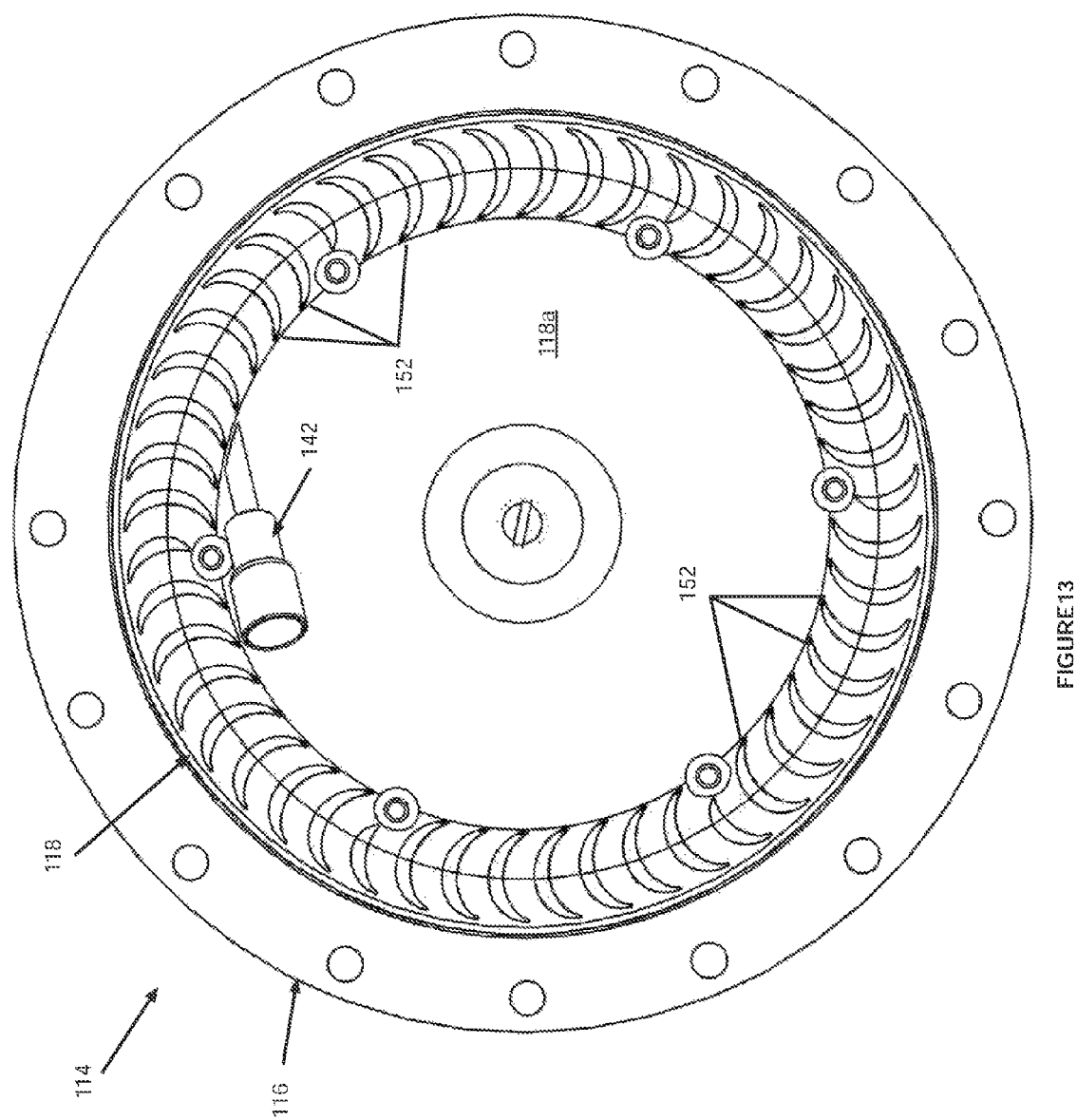
FIG. 13 is a top plan view of the energy recovery apparatus of FIG. 12.
Figure 14:
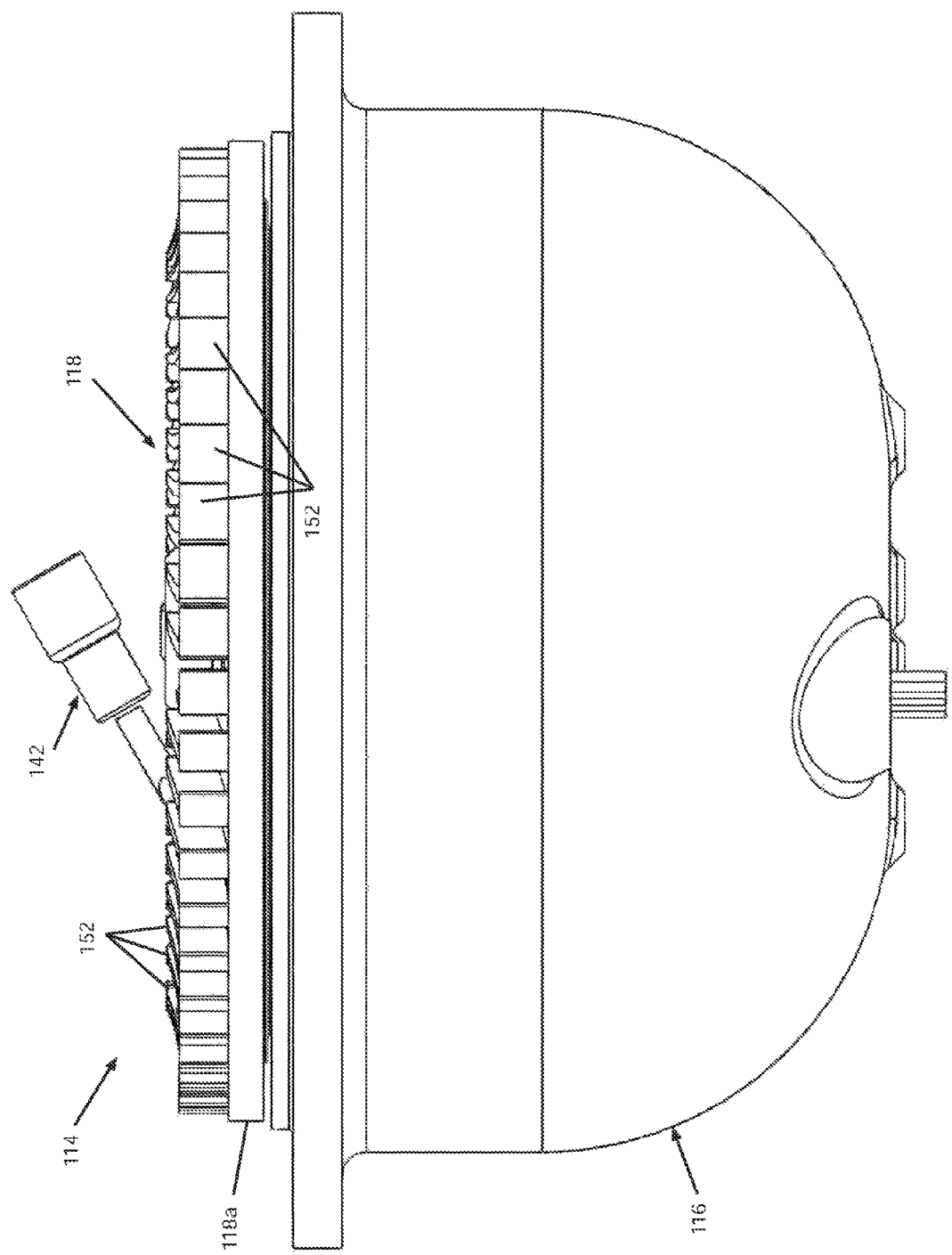
FIG. 14 is a side elevational view of the energy recovery apparatus of FIG. 12.

Another embodiment of an energy recovery apparatus of the present invention is indicated generally by reference numeral 114 in FIGS. 11-15. In FIG. 11, the energy recovery apparatus 114 is shown having a housing 116, inlet port (or intake port) 138 configured to be in fluid communication with a condenser, and an outlet opening (discharge port) 134, configured to be in fluid communication with an evaporator. In other words, like energy recovery apparatus 14, the energy recovery apparatus 114 replaces the expansion valve 8 in FIG. 2. The energy recovery apparatus 114 is similar to the energy recovery apparatus 14, except for the differences set forth herein.

The energy recovery apparatus 114 includes a turbine 118. The turbine 118 comprises a radial flow turbine having a turbine wheel 118a rotatable about a turbine axis X (see FIG. 15) with only one row of turbine blades 152, with each of the turbine blades being radially spaced from the turbine axis. The turbine blades 152 are secured to and rotate with the turbine wheel. Alternatively, the turbine could be an axial flow turbine.

The energy recovery apparatus 114 also includes nozzle 142 similar to the nozzle of the energy recovery apparatus 14, except it is positioned to direct refrigerant from a region radially inward of the row of turbine blades 152 toward the row of turbine blades 152 such that refrigerant passing through the turbine blades flows radially outward. The nozzle 142 and turbine 118 are positioned relative to each other such that the turbine is driven by refrigerant discharged from the nozzle. The discharge port of the energy recovery apparatus 114 is downstream of the turbine.

Figure 15:
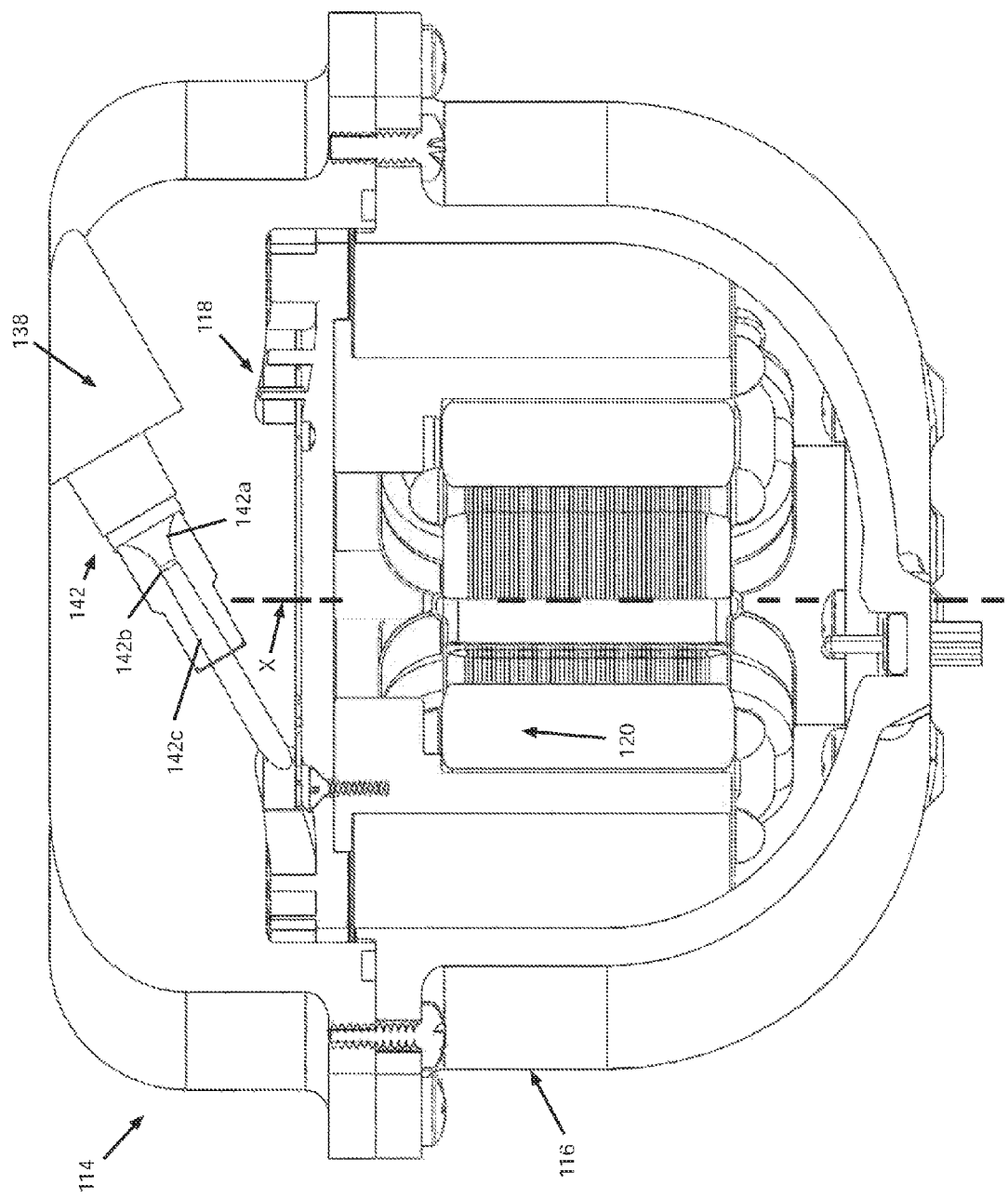
FIG. 15 is a side elevational view of the energy recovery apparatus of FIG. 11 with portions broken away to show details.

Referring to FIG. 15, the nozzle 142 comprises a converging portion 142a, a throat region 142b, and a diverging portion 142c. The converging portion 142a is downstream of the intake port, the throat portion 142b is downstream of the converging portion, and the diverging portion 142c is downstream of the throat region. As shown in FIG. 15, the nozzle 142 may also include a generally cylindrical tube extending downstream from the downstream end of the diverging portion 142c, and positioned to discharge refrigerant to the turbine 118. Preferably, the ratio of the cross-sectional area of the downstream end of the diverging portion 142c to the cross-sectional area of the throat portion 142b is between 1.2 and 1.4, and is more preferably between about 1.25 and about 1.35. The nozzle 142 is configured to expand refrigerant discharged from the condenser and increase velocity of the refrigerant as it passes through the nozzle.

The energy recovery apparatus 114 further comprises a generator 120 (FIG. 15) coupled to the turbine 118 and driven by the turbine. The generator 120 is similar to the generator 20 of energy recovery apparatus 14. The generator 120 is configured to produce electricity as a result of the turbine 118 being driven by refrigerant discharged from the nozzle. The housing 116 encompasses and contains the turbine 118 and the generator 120. Preferably, the housing 116 and the turbine 118 are in fluid communication with each other. More preferably, the housing 116, the turbine 118 and the generator 120 are arranged and configured such that refrigerant introduced into the housing cools and lubricates the generator. The housing 116 is configured such that, during normal operation, fluid introduced into the housing 116 via the intake port 138 escapes from the housing only via the discharge port 134. The turbine and generator are in fluid communication with each other such that at least some refrigerant directed to the turbine is able to flow to the generator. The internal generator also eliminates any external shafts that would have to be refrigerant sealed. In other words, the housing 116 is preferably devoid of any openings for the passage of external shafts.

In operation, the intake port 138 of the energy recovery apparatus 114 is operatively coupled (e.g., via a refrigerant line) in fluid communication to the discharge port of a condenser of a refrigerant system such that refrigerant discharged from the condenser flows into the energy recovery apparatus. Similarly, the discharge port 134 of the energy recovery apparatus 114 is operatively coupled in fluid communication to the intake port of an evaporator such that refrigerant discharged from the energy recovery apparatus flows into the evaporator. Preferably, the refrigerant system is then operated such that refrigerant is discharged from the condenser in a liquid state at a temperature below (e.g., ten degrees F. below) the liquid saturation temperature for that same pressure. The refrigerant enters the energy recovery apparatus 114 in a liquid state and is passed through the nozzle 142. The nozzle 142 is shaped and configured such that refrigerant enters the converging portion 142a in a liquid state, is expanded by the nozzle, and is then discharged from the nozzle in a liquid-vapor state. As such, passing the refrigerant through the nozzle 142 causes the refrigerant to decrease in pressure and temperature and expand from a liquid state to a liquid-vapor state. The refrigerant is discharged from the nozzle 142 at a low temperature, high velocity liquid-vapor and toward the blades 152 of the turbine 118 to cause the turbine to rotate about the turbine axis X, which also causes rotation of the permanent magnets on the cylindrical wall which form the rotor of the generator 120. The rotation of the permanent magnets induces a current in the stator windings of the generator to thereby produce electricity. The refrigerant then flows through the turbine 118 and is discharged out the discharge port 134 of the energy recovery apparatus 114 and conveyed to the evaporator.

The energy recovery apparatus of the present invention may be sold or distributed as part of a complete refrigerant system or as a separate unit to be added to a refrigerant system (e.g., to replace an expansion valve of an existing refrigeration system). In connection with the sale or distribution of the energy recovery apparatus, a user (e.g., a purchaser of the energy recovery apparatus) is instructed that the purpose of the energy recovery apparatus is to expand refrigerant in a refrigerant system be placed in fluid communication of the energy recovery apparatus is sold or distributed as a separate unit. The user is then induced to have the energy recovery apparatus placed in fluid communication with a condenser and evaporator of a refrigeration system.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A refrigeration system comprising:
an evaporator comprising an intake port and a discharge port, the evaporator being configured to evaporate a cold refrigerant from a liquid-vapor state to a vapor state;
a compressor comprising an intake port and a discharge portion, the intake port of the compressor being in fluid communication with the discharge port of the evaporator, the compressor being configured to receive refrigerant discharged from the evaporator and compress the refrigerant to an elevated, sub-critical pressure;
a condenser comprising an intake port and a discharge port, the intake port of the condenser being in fluid communication with the discharge port of the compressor, the condenser being configured to receive refrigerant discharged from the compressor and condense the refrigerant discharged from the compressor to one of a saturated-liquid state, a liquid state cooler than the saturated-liquid state, and a liquid-vapor state near the saturated-liquid state;
an energy recovery apparatus comprising an intake port and a discharge port, the intake port of the energy recovery apparatus being in fluid communication with the discharge port of the condenser, the discharge port of the energy recovery apparatus being in fluid communication with the intake port of the evaporator, the energy recovery apparatus further comprising a nozzle, a turbine, and a generator, the nozzle being configured to expand refrigerant discharged from the condenser and increase velocity of the refrigerant as it passes through the nozzle, the turbine being positioned and configured to be driven by refrigerant discharged from the nozzle, the discharge port of the energy recovery apparatus being downstream of the turbine, the generator being coupled to the turbine and driven by the turbine, the generator being configured to produce electricity as a result of the turbine being driven by refrigerant discharged from the nozzle.

2. A refrigeration system as set forth in claim 1 wherein the energy recovery apparatus further comprising a housing encompassing the turbine and the generator.

3. A method comprising operating a refrigerant system as set forth in claim 1 in a manner such that refrigerant enters the nozzle in a liquid state and is discharged from the nozzle in a liquid-vapor state.

4. An energy recovery apparatus for use in a refrigeration system, the refrigeration system comprising an evaporator, a compressor and a condenser, the evaporator being configured to evaporate a cold refrigerant from a liquid-vapor state to a vapor state, the compressor being configured to receive refrigerant discharged from the evaporator and compress the refrigerant to an elevated, sub-critical pressure, the condenser being configured to receive refrigerant discharged from the compressor and condense the refrigerant to one of a saturated-liquid state, a liquid state cooler than the saturated-liquid state, and a liquid-vapor state near the saturated-liquid state, the energy recovery apparatus comprising:
an intake port adapted to be in fluid communication with the condenser;
a discharge port adapted to be in fluid communication with the evaporator;
a nozzle adapted and configured to expand refrigerant discharged from the condenser and increase velocity of the refrigerant as it passes through the nozzle; and
a turbine positioned relative to the nozzle and configured to be driven by refrigerant discharged from the nozzle, the discharge port of the energy recovery apparatus being downstream of the turbine; and
a generator coupled to the turbine and configured to be driven by the turbine, the generator being configured to produce electricity as a result of the turbine being driven by refrigerant discharged from the nozzle.

5. An energy recovery apparatus as set forth in claim 4 wherein the nozzle is shaped and configured such that refrigerant entering the nozzle in a liquid state is expanded by the nozzle and discharged from the nozzle in a liquid-vapor state.

6. An energy recovery apparatus as set forth in claim 4 wherein the turbine comprises a radial flow turbine having a turbine wheel rotatable about a turbine axis and at least one row of turbine blades with each turbine blade of said at least one row of turbine blades being radially spaced from the turbine axis, the turbine blades of said at least one row of turbine blades being configured to rotate with the turbine wheel.

7. An energy recovery apparatus as set forth in claim 6 wherein the nozzle and turbine are arranged and positioned relative to each other in a manner such that refrigerant discharged from the nozzle is discharged in a region radially inward of and toward said at least one row of turbine blades.

8. An energy recovery apparatus as set forth in claim 7 wherein the turbine includes only one row of turbine blades.

9. An energy recovery apparatus as set forth in claim 6 wherein said at least one row of turbine blades comprises a plurality of rows of turbine blades.

10. An energy recovery apparatus as set forth in claim 9 further comprising at least one stationary row of turbine blades.

11. An energy recovery apparatus as set forth in claim 6 wherein said turbine comprises a multi-stage turbine.

12. An energy recovery apparatus as set forth in claim 6 wherein the nozzle and turbine are arranged and positioned relative to each other in a manner such that refrigerant discharged from the nozzle is discharged in a region radially outward of and toward said at least one row of turbine blades.

13. A method comprising operatively coupling the discharge port of an energy recovery apparatus as set forth in claim 4 to an evaporator of a refrigeration system such that the discharge port of the energy recovery apparatus is in fluid communication with the evaporator.

14. A method comprising instructing a user to place an energy recovery apparatus as set forth in claim 4 in fluid communication with an evaporator of a refrigeration system.

15. A method comprising selling an energy recovery apparatus as set forth in claim 4 and including with the energy recovery apparatus indicia that the energy recovery apparatus is to be placed in fluid communication with an evaporator of a refrigeration system.

16. A method comprising instructing a user to place an energy recovery apparatus as set forth in claim 4 in fluid communication with a refrigeration line of a refrigeration system.

17. A method comprising inducing a user to place an energy recovery apparatus as set forth in claim 4 in fluid communication with a refrigeration line of a refrigeration system.

18. A method comprising inducing a user to place an energy recovery apparatus in fluid communication with a refrigeration line of a refrigeration system, the refrigeration system comprising an evaporator, a compressor and a condenser, the evaporator being configured to evaporate a cold refrigerant from a liquid-vapor state to a vapor state, the compressor being configured to receive refrigerant discharged from the evaporator and compress the refrigerant to an elevated, sub-critical pressure, the condenser being configured to receive refrigerant discharged from the compressor and condense the refrigerant to one of a saturated-liquid state, a liquid state cooler than the saturated-liquid state, and a liquid-vapor state near the saturated-liquid state, the energy recovery apparatus comprising:

an intake port adapted to be in fluid communication with the condenser;

a discharge port adapted to be in fluid communication with the evaporator;

a nozzle adapted and configured to expand refrigerant discharged from the condenser and increase velocity of the refrigerant as it passes through the nozzle; and a turbine positioned relative to the nozzle and configured to be driven by refrigerant discharged from the nozzle, the discharge port of the energy recovery apparatus being downstream of the turbine; and a generator coupled to the turbine and configured to be driven by the turbine, the generator being configured to produce electricity as a result of the turbine being driven by refrigerant discharged from the nozzle.

\* \* \* \* \*